(No Model.)
H. C. HODGES.
VALVE.
No. 548,707.
Patented Oct. 29, 1895.
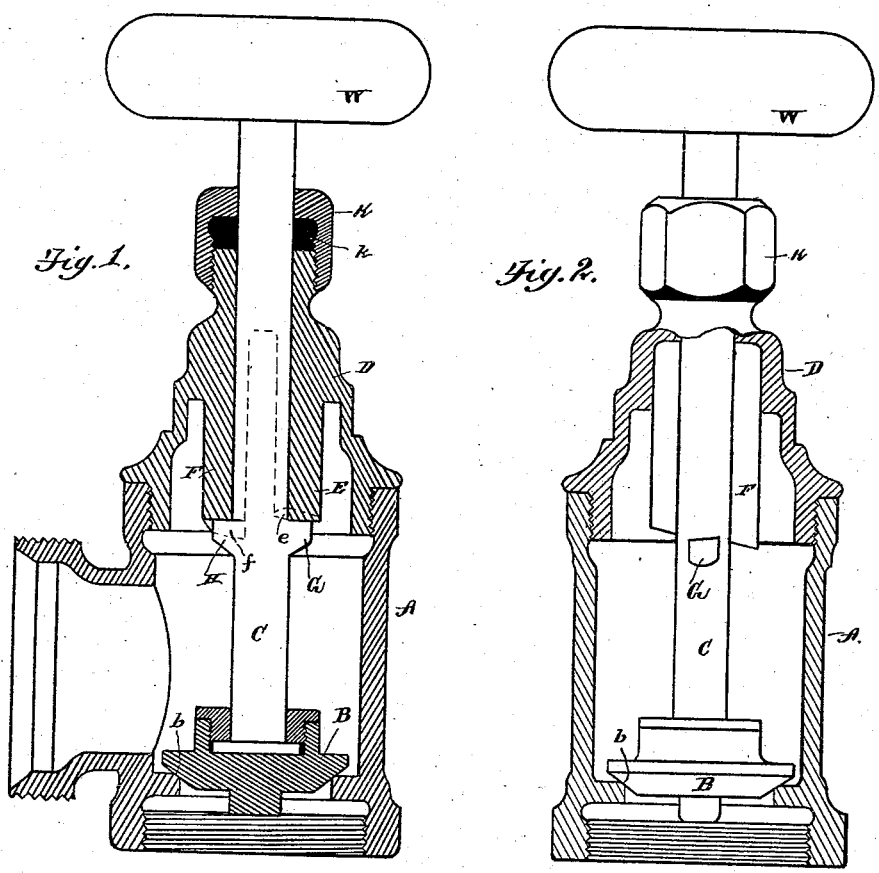
WITNESSES
F. Clough,
D. W. Bradford.
INVENTOR
Henry C. Hodges.
By Parker & Burton
Attorneys.

UNITED STATES PATENT OFFICE.

HENRY C. HODGES, OF DETROIT, MICHIGAN.

VALVE.

SPECIFICATION forming part of Letters Patent No. 548,707, dated October 29, 1895.

Application filed December 22, 1893. Serial No. 494,437. (No model.)

*To all whom it may concern:*

Be it known that I, HENRY C. HODGES, a citizen of the United States, residing at Detroit, county of Wayne, State of Michigan, have invented a certain new and useful Improvement in Valves; and I declare the following to be a full, clear, and exact description of the invention, such as will enable others skilled in the art to which it pertains to make and use the same, reference being had to the accompanying drawings, which form a part of this specification.

This invention relates to valves, and has for its objects improvements in that class of valves which are employed where it is desired to have a quick opening and closing of the valve proper and at the same time to have the valve so firmly seated as to resist considerable pressure, either of steam or water, and at the same time so accurately seated as to prevent leakage of the fluid between the valve and its seat.

The valve in which is embodied this invention is especially applicable for use in connection with steam-radiators where it is desired to have a full opening of the valve and to produce such opening with a single turn or less than a single turn of the mechanism employed to hold the valve to its seat. In this valve it is only necessary to turn the holding mechanism one-quarter of a turn, when the valve is immediately released from its seat and can be moved entirely out of the fluid passage-way, so as to permit the unimpeded flow of the fluid therethrough. In closing the valve the same facility of quick operation is attained. The valve proper is of the class known as "balanced" or "partially-balanced" valves, and after leaving its seat is so nearly balanced as to present little or no obstacle to its free movement in the casing in which it is contained.

In the drawings, Figures 1 and 2 are both sectional elevations, the one being taken at right angles to the other and both showing sections of the casings in which the valve is contained.

A indicates the casing; B, the valve proper, resting on its seat $b$.

C indicates the stem of the valve which is connected with the valve proper by a swivel, such that the stem C is free to rotate axially without a corresponding rotation of the valve. The valve-casing is prolonged or extended on one side of the passage-way to furnish a bearing for the stem C. The prolongation takes the form of a screw-cap D, on the interior of which are two struts E and F, united at the outer end of the cap and projecting inward parallel with the axis of the valve-stem C, which lies between them and extends through a round hole in the extreme outer end of the cap D.

Each of the struts E and F terminates at the inner end with an oblique face, oblique to the axis of the stem C. The two oblique surfaces $e$ $f$ lie athwart each other and together form a surface which may be compared to the surface of a single thread of a screw, differing, however, from the single thread of a screw in that the one surface is not continuous of the other.

The two struts E and F are separated or spaced from each other for a distance extending backward from the bearing-surfaces $e f$ sufficient to permit the withdrawal of the valve from its seat and completely open the passage-way for the fluids. The distance between the opposing faces of the two struts E F is enough to permit the free movement of the lugs or pins G and H. On the valve-stem C are two pins or lugs G H, of proper size to move freely in the passage-way between the struts E F when the stem is turned, so that the longitudinal axis through the pins G and H across the stem lies in the opening between the struts E and F. The pins G and H extend from the stem C and furnish a strong engaging surface between the pins and the lower oblique surfaces of E and F when the stem C is turned, so as to place the axis across the stem through the pins G and H athwart the struts E and F. When in this latter position, the pins G and H must be entirely below the inner ends of the struts E and F.

At the top of the cap D is the ordinary packing-cap K, beneath which is placed a gasket or packing $k$. The outer end of the valve-stem C terminates in the usual hand-wheel W or in any other suitable means for operating the stem of the valve.

The operation of the valve is as follows: It is only necessary to give the stem a quarter of a turn, when the pins G and H will register with the passage-way between E and F, and the valve can be immediately lifted entirely out of the fluid passage-way, or so fully out of the fluid passage-way as to afford no resistance to the flow of the fluids. To close the valve, it is simply pushed inward until the pins G and H pass below the lower surface of the struts E and F, when a partial turn, quarter-turn, or less will force the valve firmly against its seat, because of the engagement between the upper sides of the pins G and H and the lower oblique surfaces of the struts E F.

It will be observed that when properly adjusted it will be impossible to give to the valve-stem more than a quarter-turn, or about a quarter-turn, because in one direction the parts are stopped by the engagement between the valve and its seat and the corresponding engagement between the pins and the struts. When attempting to turn the valve-stem in the opposite direction, as soon as the pins G and H have passed fully into the mouth of the passage-way between E and F the pin G or H, as the case may be, will engage with the extreme lower end of the opposing strut E or F and prevent the further rotation of the stem, and thus the struts E and F act as stops to determine the correct position of the valve-stem for withdrawing the valve.

It will be noticed that the lowermost point of the cams extends down below the lowest point to which the projections are permitted to go. By this means the cams or inclined surfaces form a stop to the rotation of the stem in one direction, while the vertical end walls of the cams form aligning stops to the rotation of the stem in an opposite direction, and at which point the stem may be drawn out, its projections entering in between the lugs.

What I claim is—

1. In a valve, the combination with a casing having a valve seat, of a reciprocating valve stem, a valve thereon, projections on the stem above the valve, and fixed lugs on opposite sides of the stem, having an elongated passage between to permit the vertical movement of the projections to a point above the lower ends of the lugs, said lugs having inclined stops on their lower edges limiting the rotary movement of the stem in opposite directions and forcing the valve to its seat, substantially as described.

2. In a valve, the combination with the casing having a valve seat therein, of a rotary and reciprocating valve stem, a valve thereon, lateral projections on the stem, and lugs on the casing arranged to be engaged by the projections having inclined lower faces the lowermost point of which is located at a point below the point of extreme lower position of the projections on the stem thereby forming stops, substantially as described.

3. In a valve, the combination with the casing having a valve seat therein, of a reciprocating and rotary valve stem, having lateral projections thereon, lugs in the casing arranged on opposite sides of the stem and having an elongated separating passage between in which the stem and its projections move, and oppositely inclined cams on the lower edges of the lugs having their lower ends arranged in line with the space between the lugs thereby forming aligning stops for the lugs, substantially as described.

4. In a valve, the combination with a casing having a valve seat therein, of a rotary and reciprocating valve stem having lateral projections thereon, cams with which the projections engage, spaced apart to form an elongated passage into which the projections pass, stops arranged to check the rotary movement of the stem when the projections are between the cams, and a valve on the stem, substantially as described.

5. The combination with a valve casing and a valve seat therein, a rotary and reciprocating valve stem having lateral projections, cams with which the projections engage, spaced to permit the reciprocating motion of the valve stem, and oppositely inclined whereby they furnish stops limiting the rotary movement in one direction and coact with the valve seat to stop rotary movement in the other direction and hold the valve closed.

In testimony whereof I sign this specification in the presence of two witnesses.

HENRY C. HODGES.

Witnesses:
D. W. BRADFORD,
CHARLES F. BURTON.